July 5, 1927.
F. D. HOLDSWORTH
1,634,499
SHAFT COUPLING
Filed March 24, 1924
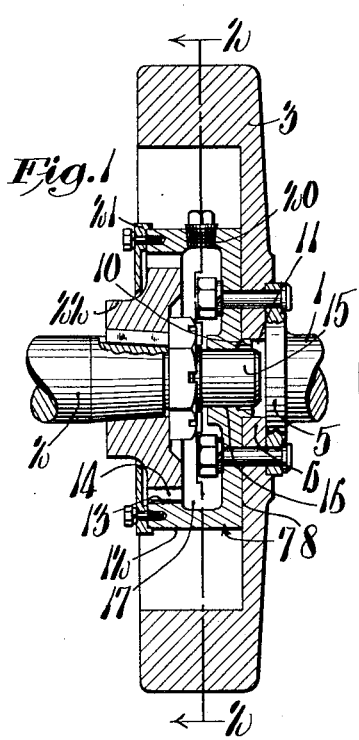
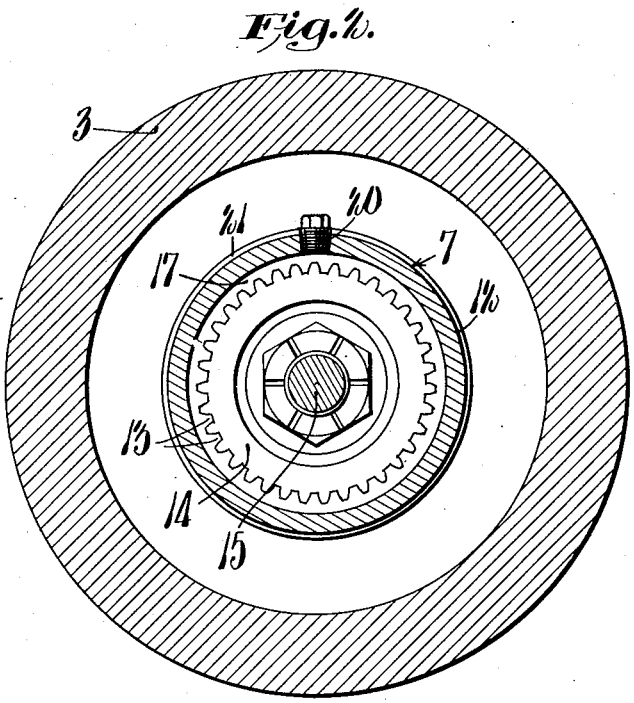
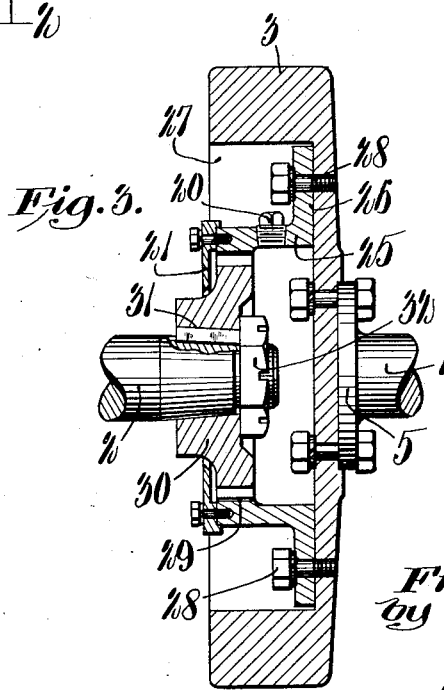
Inventor:
Fred D. Holdsworth.
by
Horace __ ___
atty.

Patented July 5, 1927.

1,634,499

UNITED STATES PATENT OFFICE.

FRED D. HOLDSWORTH, OF CLAREMONT, NEW HAMPSHIRE, ASSIGNOR TO SULLIVAN MACHINERY COMPANY, A CORPORATION OF MASSACHUSETTS.

SHAFT COUPLING.

Application filed March 24, 1924. Serial No. 701,364.

This invention relates to shaft couplings. It has for its object to provide an improved coupling. It has for a further object to provide an improved coupling which is extremely simple and will allow longitudinal movement between the driving and driven shafts and at the same time keep positive connection between said members. It is a further object to provide an improved type of coupling which will allow this longitudinal movement and at the same time prevent rotation of one shaft relative to the other. It has for a further object to provide an improved means whereby the relatively movable parts of my improved device can be sufficiently lubricated.

In the accompanying drawings I have shown for purposes of illustration two forms which my invention may assume in practice.

In these drawings,—

Fig. 1 is a vertical longitudinal section.

Fig. 2 is a transverse section on line 2—2 of Fig. 1.

Fig. 3 is a modified form of the device.

In the illustrative embodiment of my invention I have shown a driving shaft 1 connected to a driven shaft 2, the driving shaft 1 having a usual flywheel 3 connected thereto as by bolts passing through flanges 5 and 6 mounted upon the shaft 1 and flywheel 3 respectively. Also fixed to the flywheel as by the bolt connections is a coupling member 7 comprising an annulus 8 disposed adjacent the flywheel and through which the bolts pass. A boss 10 formed thereon acts as a means for centering the annulus 8 with respect to the flywheel by projecting into a recess 11 formed therein. Projecting axially from the annulus 8 is a rim 12 having internal gear teeth 13 formed on the outermost portion thereof, so as to leave a space between the innermost end of the teeth 13 and the annulus 8.

In order that a positive connection may be effected between the teeth 13 and the driven shaft 2, I mount upon the latter an external gear 14 which has sliding engagement with the teeth 13. Projecting forwardly of gear 14 and in axial alinement with the shaft 2 is a cylindrical portion 15 slidably mounted within a bore 16, thereby maintaining the gear 14 in perfect alinement with respect to the gear 13. The gear 14 thereby closes the outer end of the rim 12 and leaves a chamber 17 formed therein. Lubricant is supplied to this chamber as through a plugged hole 20 and is prevented from passing beyond the gear 14 as by a cover 21 bolted to the member 12 which has a substantially dust-proof fit with a boss 22 formed on the outer side of the gear 14.

In Fig. 3 I have shown a modified form of my improved coupling which comprises an annular portion 25 carrying on its forward end a radial flange 26 adapted to be bolted to the inner surface of a recess 27 formed in the flywheel as by bolts 28, while the rear end of the annular portion carries an internal gear 29. Meshing with the gear 29 is a usual spur gear 30 removably and non-rotatably secured upon the drive shaft as by a keyway 31 and nut 32. It is to be understood that in either form of my device the gear teeth are provided with sufficient clearance. Such clearance is also provided between the projection 15 and its bearing support. This clearance is not great enough, however, to allow the cooperating elements to be unnecessarily loose, but just enough to allow slight non-alinement of the cooperating members.

During operation of this device the relatively movable parts will be easily and positively lubricated. The extreme simplicity of the device also prevents any excessive wear due to the relatively few moving parts. Due to the arrangement of the elements the coupling can be placed within an exceedingly small space, herein shown as a recess of a flywheel, this compactness being highly desirable when it is employed on portable outfits or other close quarters.

While I have in this application specifically described two forms which my invention may assume in practice, it will be understood that these forms of the same are shown for purposes of illustration and that the invention may be modified and embodied in other forms without departing from its spirit or the scope of the appended claims.

What I claim as new and desire to secure by Letters Patent is:

1. In combination, a shaft having a fly wheel, a second shaft, a shaft coupling for connecting said shafts comprising members affording directly engaging internal and external surfaces, said members bearing a fixed relation to their respective shafts, and means for maintaining alinement between said shafts including a second set of cooperating engaging surfaces disposed within the transverse limits of the first set of surfaces.

2. A shaft coupling adapted to join two shafts one of which has a fly wheel and comprising a member having annular and radial flanges, means for securing said radial flange to said fly wheel, internal gear teeth formed on said annular flange at a point spaced a substantial distance from said radial flange, a shaft and external gear mounted thereon directly engaging said internal gear.

3. A shaft coupling adapted to join two shafts one of which has a fly wheel comprising a member having radial and annular flanges, internal gear teeth formed on said annular flange a substantial distance from said radial flange, an external gear fixed to the other of said shafts and directly meshing with said internal gear whereby to form a chamber between said gears and radial flange, and bolts for securing said internal gear to said fly wheel having portions disposed within said chamber, said chamber also providing a lubricant reservoir.

In testimony whereof I affix my signature.

FRED D. HOLDSWORTH.